J. H. COOK.
Feed-Rolls for Grain-Drills.
No. 154,227.    Patented Aug. 18, 1874.
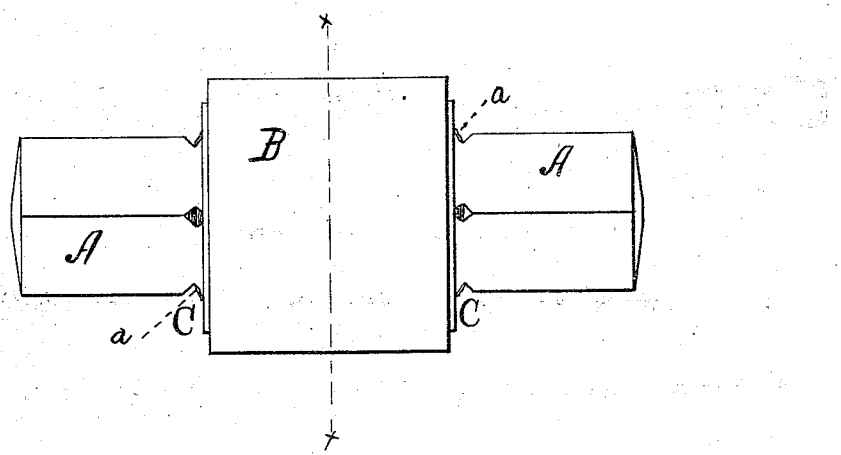
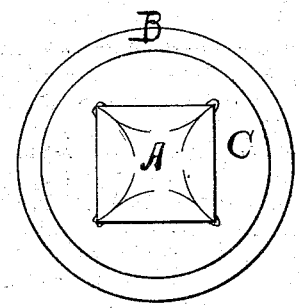
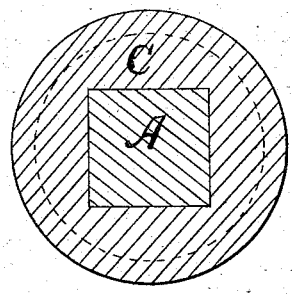
WITNESSES
Robert Everett.
George Ellpham.
BY
INVENTOR
John H. Cook
Chipman Hosmer & Co
ATTORNEYS

UNITED STATES PATENT OFFICE.

JOHN H. COOK, OF HAGERSTOWN, MARYLAND.

IMPROVEMENT IN FEED-ROLLS FOR GRAIN-DRILLS.

Specification forming part of Letters Patent No. 154,227, dated August 18, 1874; application filed June 13, 1874.

*To all whom it may concern:*

Be it known that I, JOHN H. COOK, of Hagerstown, in the county of Washington and State of Maryland, have invented a new and valuable Improvement in Feed-Rolls; and I do hereby declare that the following is a full, clear, and exact description of the construction and operation of the same, reference being had to the annexed drawings making a part of this specification, and to the letters and figures of reference marked thereon.

Figure 1 of the drawing is a representation of a front view of my feed-roll, and Fig. 2 is an end view. Fig. 3 is a sectional view.

This invention has relation to means for fastening and securing in place the elastic feed-rolls used in the Keller or other grain-drill in which feed-rolls are employed. The novelty consists in collars or disks of any suitable metal, which are applied upon a shaft close up against the ends of the elastic rolls, and are securely held in proper position by burring up the said shaft, whereby the feed-rolls are prevented from endwise displacement, as will be hereinafter more fully explained.

In the annexed drawings, in which I have caused to be shown only those parts of a grain-drill necessary to illustrate my invention, A designates the shaft for receiving the feed-rolls of rubber used in the Keller drill, and which is preferably rectangular in shape in cross-section. B designates an elastic-gum feed-roll, which is applied upon the roller-shaft A, of which rolls the number corresponds to the number of the feed-apertures in the grain-hopper. C are metallic collars or disks, through which is constructed a central perforation, preferably of rectangular form, to permit of their being applied upon the shaft A, in close contact with the ends of the gum feed-rolls B, against which they are firmly upset by means of lips or burrs *a* at the angles of the shaft A, as shown in Fig. 1.

In the seed-drills as used at present, feed-rolls are applied upon their shaft without any adequate means for preventing endwise displacement, and in consequence, when such displacement caused by natural wear and tear does occur, great inconvenience and uneven sewing is the result; but by using the collars or disks above described rigidly upset against the ends of the gum feed-rolls, any endwise displacement is effectually prevented and a regular distribution of the seed secured.

What I claim as new, and desire to secure by Letters Patent, is—

The collars or disks C, applied upon a feed-roll shaft, A, and rigidly held in place against the ends of an elastic feed-roll, B, by upsetting, substantially as specified.

In testimony that I claim the above I have hereunto subscribed my name in the presence of two witnesses.

JOHN H. COOK.

Witnesses:
H. H. KEEDY,
W. P. LANE.